(12) United States Patent
Yamaguchi

(10) Patent No.: US 11,040,660 B2
(45) Date of Patent: Jun. 22, 2021

(54) MONITOR DISPLAY SYSTEM AND DISPLAY METHOD OF THE SAME

(71) Applicant: Japan Display Inc., Minato-ku (JP)

(72) Inventor: Kazunori Yamaguchi, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 16/218,633

(22) Filed: Dec. 13, 2018

(65) Prior Publication Data
US 2019/0217780 A1    Jul. 18, 2019

(30) Foreign Application Priority Data
Jan. 17, 2018   (JP) .............................. JP2018-005474

(51) Int. Cl.
| | | |
|---|---|---|
| *B60R 1/00* | (2006.01) | |
| *B60R 11/04* | (2006.01) | |
| *B60R 1/10* | (2006.01) | |
| *B60R 1/12* | (2006.01) | |
| *H04N 5/232* | (2006.01) | |
| *H04N 7/18* | (2006.01) | |

(52) U.S. Cl.
CPC ................ *B60R 1/006* (2013.01); *B60R 1/00* (2013.01); *B60R 1/10* (2013.01); *B60R 1/12* (2013.01); *B60R 11/04* (2013.01); *H04N 5/23287* (2013.01); *H04N 7/181* (2013.01); *B60R 2001/1253* (2013.01); *B60R 2300/105* (2013.01); *B60R 2300/202* (2013.01); *B60R 2300/802* (2013.01)

(58) Field of Classification Search
CPC ........... B60R 1/006; B60R 1/002; B60R 1/00; G06T 7/20; G06K 9/00791
See application file for complete search history.

(56) References Cited

U.S. PATENT DOCUMENTS

| | | | | |
|---|---|---|---|---|
| 8,339,252 B2* | 12/2012 | Ozaki | ....................... | B60R 1/00 340/435 |
| 8,570,188 B2* | 10/2013 | Yamashita | ......... | G06K 9/00805 340/904 |
| 8,988,524 B2* | 3/2015 | Smyth | ....................... | G06T 7/20 348/121 |

(Continued)

FOREIGN PATENT DOCUMENTS

JP    2008-46766    2/2008

OTHER PUBLICATIONS

NPL Google Search; 2020; (Year: 2020).*

(Continued)

*Primary Examiner* — Luis Perez-Fuentes
(74) *Attorney, Agent, or Firm* — Oblon, McClelland, Maier & Neustadt, L.L.P.

(57) ABSTRACT

According to one embodiment, a vehicle-mounted monitor display system includes a camera which captures an image of outside scenery which is a blind spot of a driver created by a pillar, a display which displays an image on the pillar, and an image processing device which generates a display image by cutting out the image captured by the camera in conformity with a display range of the pillar, and outputs the display image to the display. In the image processing device, a resolution of the display image is reduced in a state where a vehicle equipped therewith is moving.

9 Claims, 15 Drawing Sheets

(56) References Cited

U.S. PATENT DOCUMENTS

| | | | | |
|---|---|---|---|---|
| 9,041,826 B2* | 5/2015 | Jung | ................... | H04N 7/0122 |
| | | | | 348/221.1 |
| 9,845,053 B2* | 12/2017 | Ukeda | ...................... | B60R 1/00 |
| 10,229,595 B2* | 3/2019 | Loeillet | ................. | G08G 1/166 |
| 10,558,264 B1* | 2/2020 | Watson | ................... | G06F 3/012 |
| 2002/0003571 A1* | 1/2002 | Schofield | ................ | B60R 1/00 |
| | | | | 348/148 |
| 2008/0258888 A1* | 10/2008 | Kubota | ..................... | B60R 1/00 |
| | | | | 340/436 |
| 2015/0002642 A1* | 1/2015 | Dressler | .............. | H04N 13/305 |
| | | | | 348/51 |

OTHER PUBLICATIONS

Transparent a-pillar eliminates blind area; Hammerschmidt; 2018; (Year: 2018).*

Toyota Co. patents an A-pillar you can see through; Snyder; Aug. 2017; (Year: 2017).*

Drivers 360° vision thanks to cameras that make window pillars 'transparent'; Jaguar; Dec. 2014; (Year: 2014).*

* cited by examiner

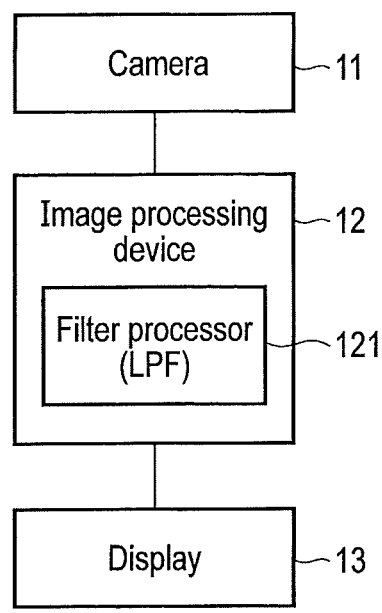
F I G. 1
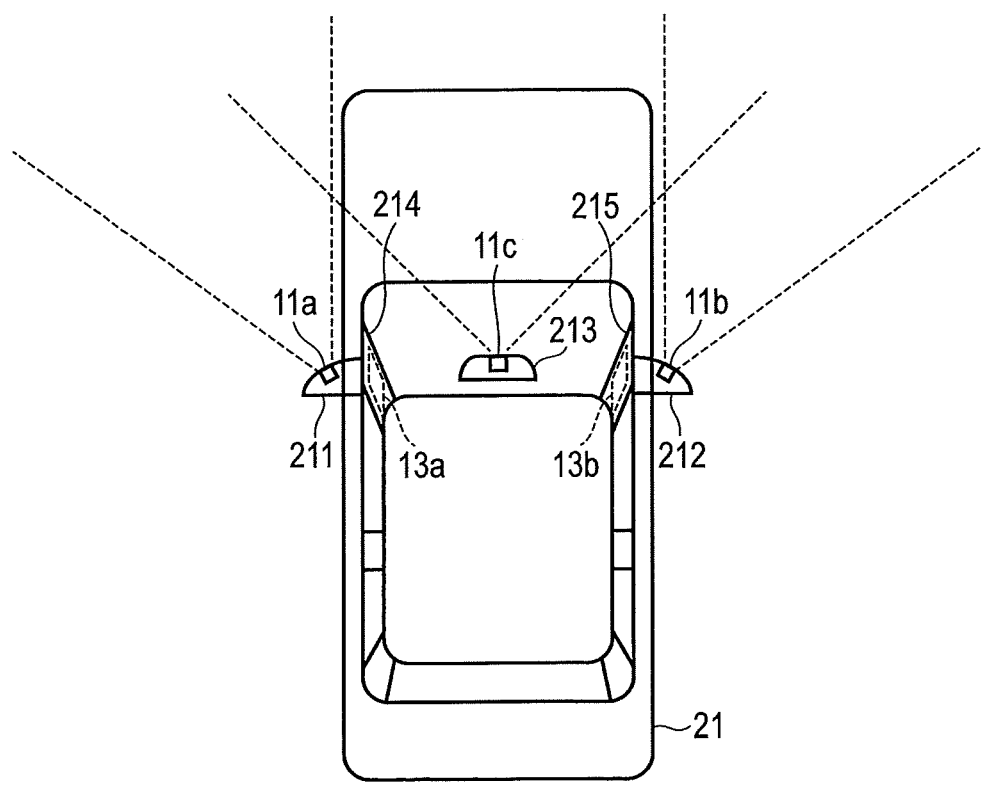
F I G. 2

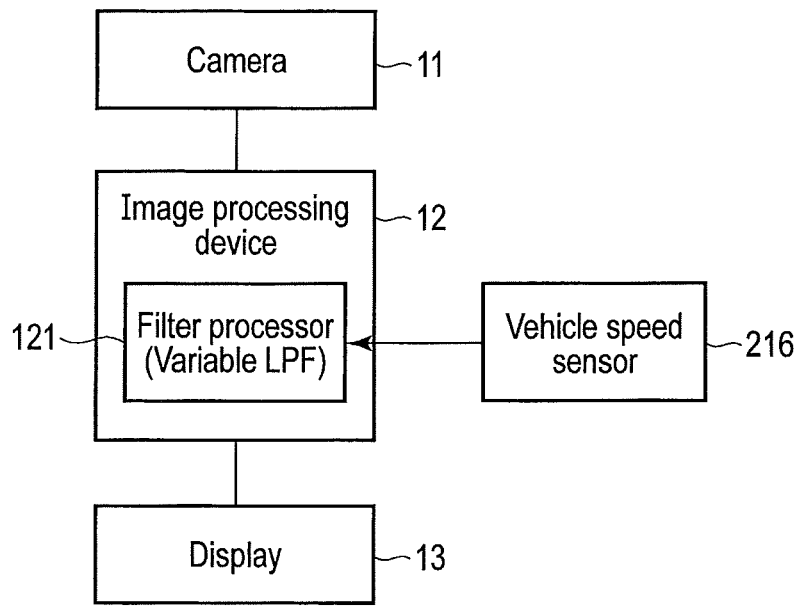
F I G. 10
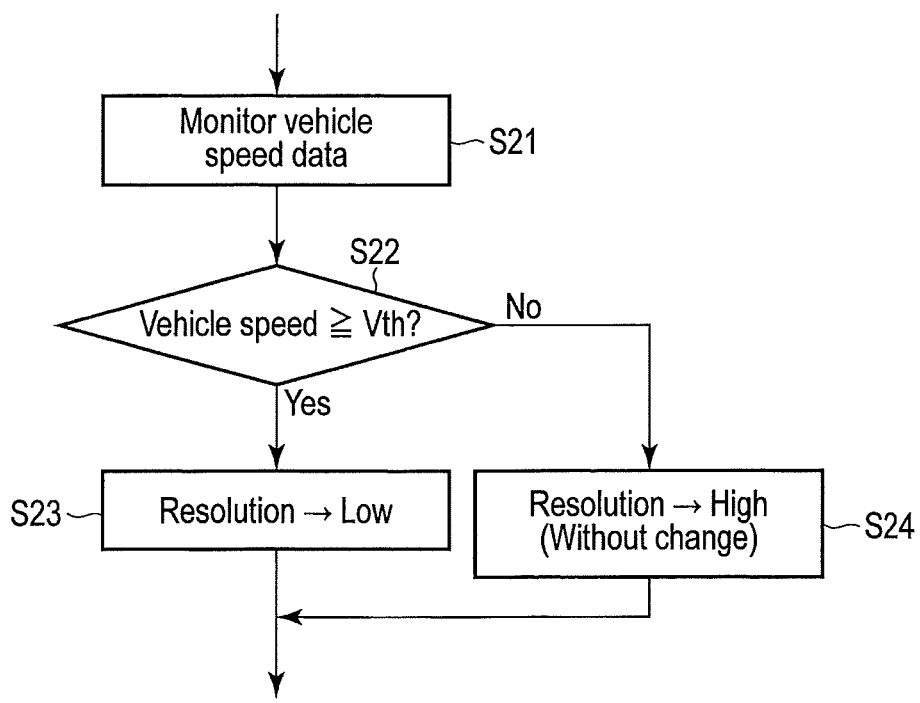
F I G. 11

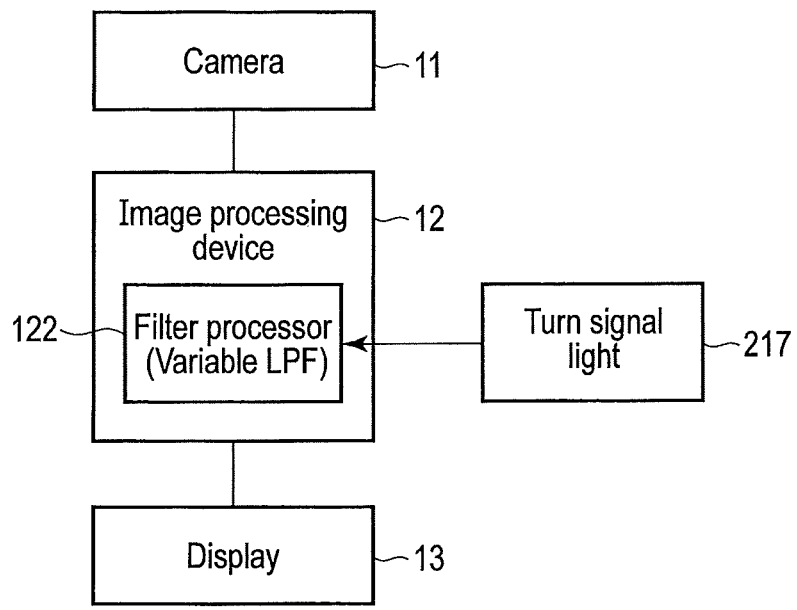
F I G. 12
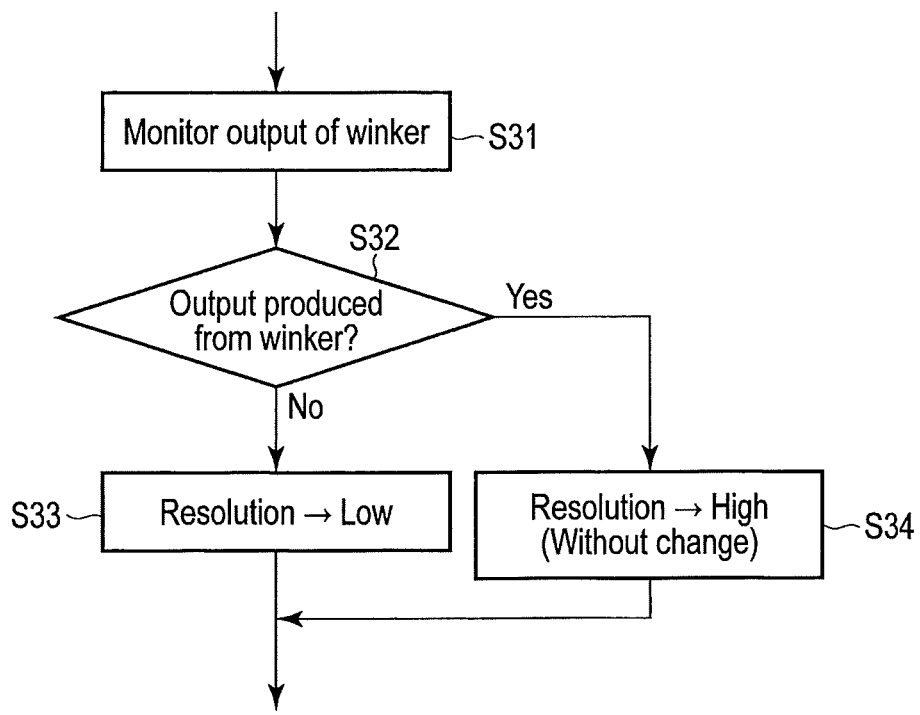
F I G. 13

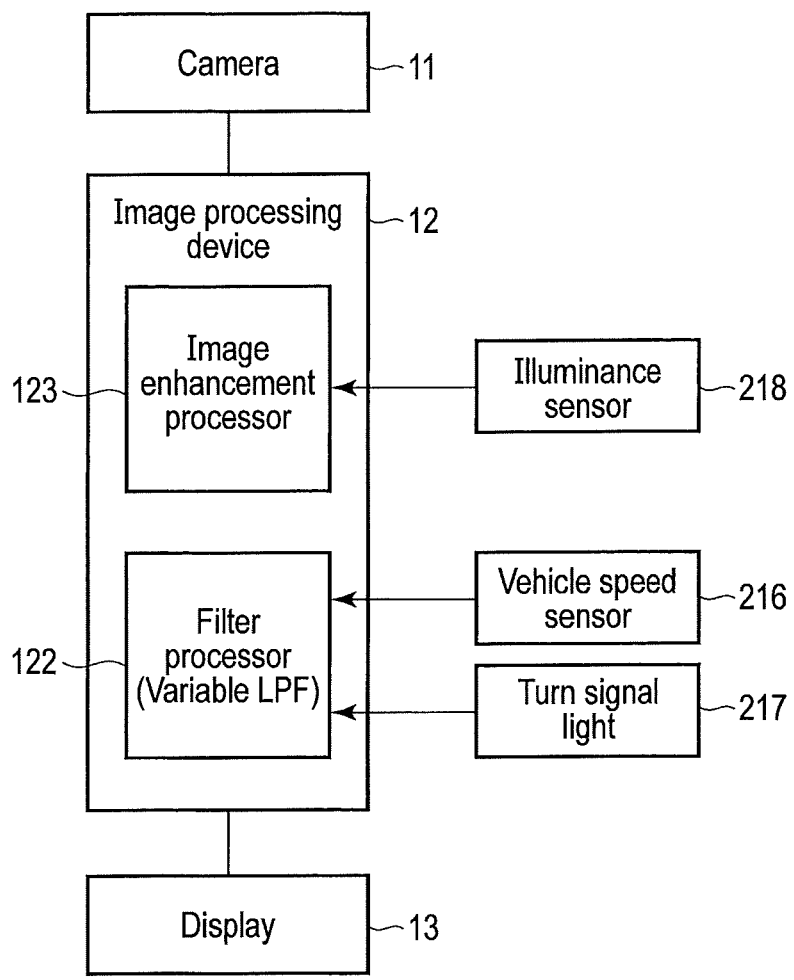
F I G. 14

F I G. 16A
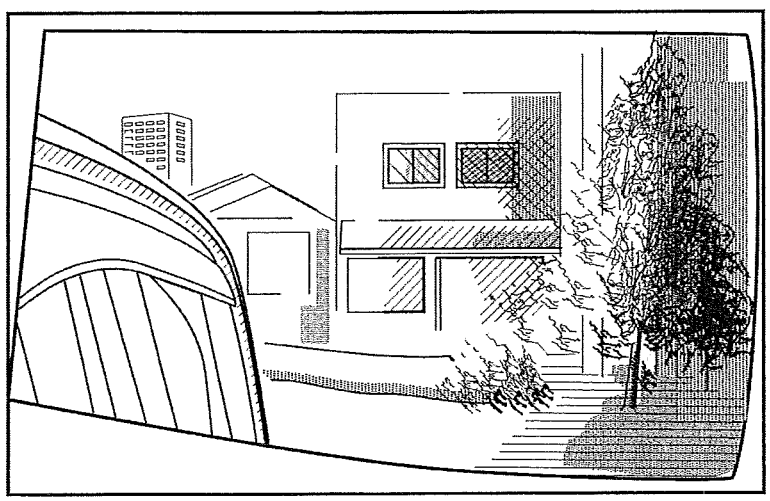
F I G. 16B

MONITOR DISPLAY SYSTEM AND DISPLAY METHOD OF THE SAME

CROSS-REFERENCE TO RELATED APPLICATIONS

This application is based upon and claims the benefit of priority from Japanese Patent Application No. 2018-005474, filed Jan. 17, 2018, the entire contents of which are incorporated herein by reference.

FIELD

Embodiments described herein relate generally to a monitor display system which displays, for example, circumstances outside a vehicle on a monitor for the driver of the vehicle, and a display method of the same.

BACKGROUND

In the driving of a vehicle, a blind spot created when, particularly, a window frame of an A-pillar (hereinafter referred to as a pillar portion) blocks driver's view causes a serious safety problem. However, recently, in the development of a vehicle, there has been a trend to make the pillar portion thicker to improve safety from crash, and the blind spot has been enlarged, accordingly.

To solve this problem, a vehicle-mounted monitor display device adopting an image display system (camera monitoring system [CMS]) composed of a combination of a camera and a display has been considered. That is, according to this monitor display device, displays of the CMS are mounted on pillar portions, images visible from a front window, side windows and the like are captured by cameras of the CMS together with the ranges of blind spots created by window frames, images of the ranges of blind spots are cut out and are displayed on the displays mounted on the pillar portions, respectively. However, in this monitor display device, it is extremely difficult to make the images of the ranges of the blind spots displayed on the displays perfectly continuous with the real images visible from the windows, respectively. If the differences of these images are large in terms of continuity, this causes the driver to make a visual recognition error or gives an uncomfortable feeling to the driver, and safety will be rather impaired.

BRIEF DESCRIPTION OF THE DRAWINGS

FIG. 1 is a block diagram showing the configuration of a monitor display system according to the first embodiment.

FIG. 2 is a conceptual diagram showing an arrangement example of cameras and displays in a case where the first embodiment is applied to a vehicle.

FIG. 10 is a block diagram showing the configuration of a monitor display system according to the second embodiment.

FIG. 11 is a flowchart showing the flow of image processing of the second embodiment.

FIG. 12 is a block diagram showing the configuration of a monitor display system according to the third embodiment.

FIG. 13 is a flowchart showing the flow of image processing of the third embodiment.

FIG. 14 is a block diagram showing the configuration of a monitor display system according to the fourth embodiment.

FIGS. 16A and 16B are views showing an image visible with naked eyes and an image displayed by a CMS.

DETAILED DESCRIPTION

Figure 3:
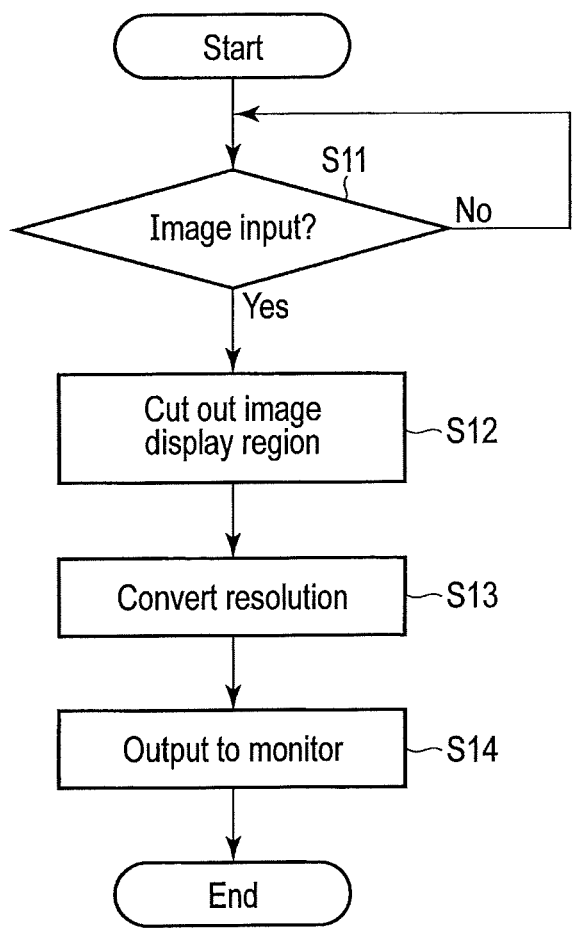
FIG. 3 is a flowchart showing the flow of image processing of the first embodiment.

In general, according to one embodiment, a vehicle-mounted monitor display system comprises a camera, a display and an image processing device. The camera captures an image of outside scenery in a range of a blind spot of a driver created by a pillar. The display displays an image on the pillar. The image processing device generates a display image by cutting out the image captured by the camera in conformity with a display range of the pillar, and outputs the generated display image to the display. The image processing device reduces a resolution of the display image in a state where a vehicle equipped therewith is moving.

According to the above-described configuration, it is possible to reduce a visual recognition error and an uncomfortable feeling at the time of visual recognition due to discontinuity between a real image and a display image of the range of a blind spot.

Various embodiments will be described hereinafter with reference to the accompanying drawings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

A monitor display system according to the first embodiment will be described for a vehicle-mounted monitor display system.

FIG. 1 is a block diagram showing the basic configuration of the monitor display system according to the present embodiment, and FIG. 2 is a conceptual diagram showing an arrangement example of cameras and displays in a case where the first embodiment is applied to a vehicle. The system shown in FIG. 1 comprises a camera 11, an image processing device 12 and a display 13. As shown in FIG. 2, the cameras 11 are arranged on back surfaces (11a and 11b) of left and right side mirrors 211 and 212 of a vehicle 21 or a lower portion (11c) of a front mirror 213. The range of an image to be captured is set in consideration of driver's sight, the range of a real image from a window and the range of a blind spot created by a pillar portion. The image processing device 12 is installed in an arbitrary position inside the vehicle, and obtains an images from each of the cameras 11, cuts out a predetermined range from the image, performs filtering (here, resolution selection processing by a low-pass filter [LPF]) according to conditions in a filter processor 121, and produces an output. The displays 13 are attached to inner sides (13a and 13b) of left and right A-pillars 214 and 215 as shown in FIG. 2.

In the above-described configuration, image processing of the present embodiment will be described with reference to the flowchart shown in FIG. 3.

Firstly, when an image captured by the camera 11 is input (Step S11), a region which is set in consideration of driver's sight, the range of a real image from a window and the range of a blind spot by a pillar is cut out from the image (Step S12), resolution conversion through which the sharpness of the image is reduced according to conditions is performed in the filter processor 121 (Step S13), and the brightness is adjusted and the image is output to the monitor (Step S14).

That is, in the present embodiment, the sharpness (the degree of haziness, the degree of scattering and the degree of blurriness) of the image captured by the display 13 attached to the pillar portion is intentionally reduced, and the image is displayed as if the image were seen through a frosted glass. Accordingly, it is possible to prevent impairment of safety caused by the blind spot by making the driver think that there is something behind the pillar.

Specific examples will be described below.

Figure 4A:
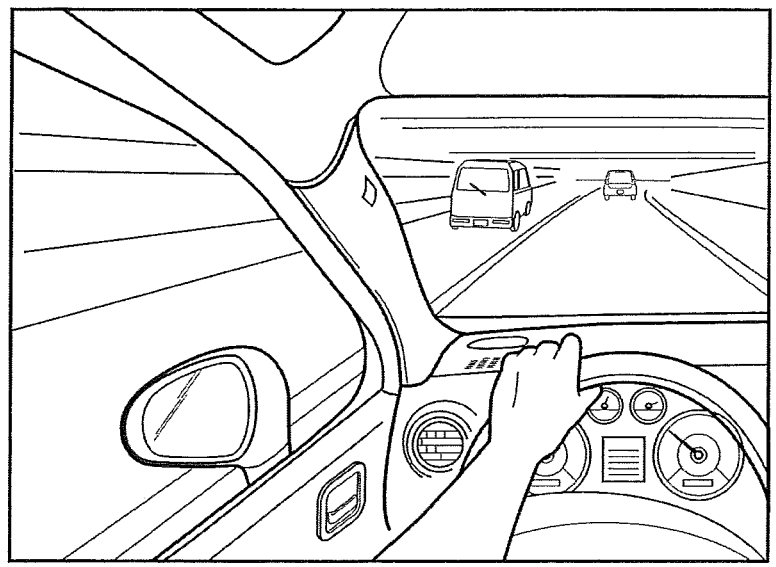
FIGS. 4A and 4B are views showing a case where a display is mounted on an A-pillar and monitor display is performed when a vehicle is running at high speed.
Figure 4B:
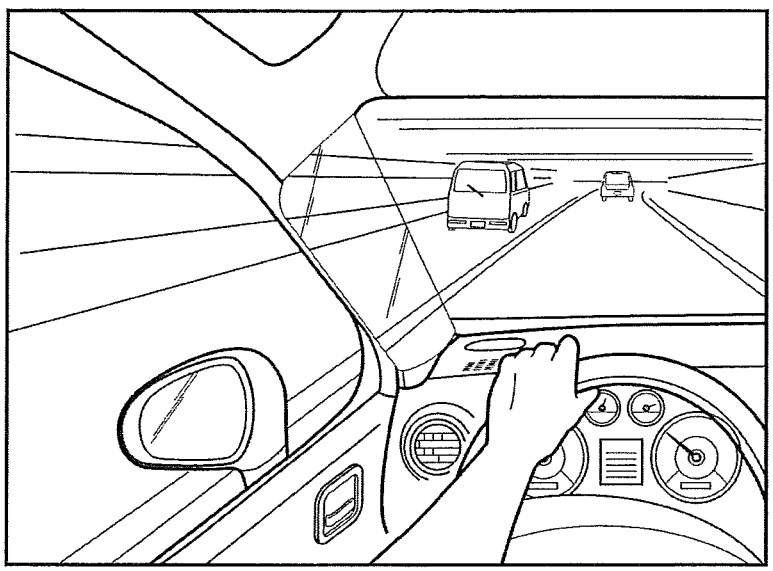
Figure 5A:
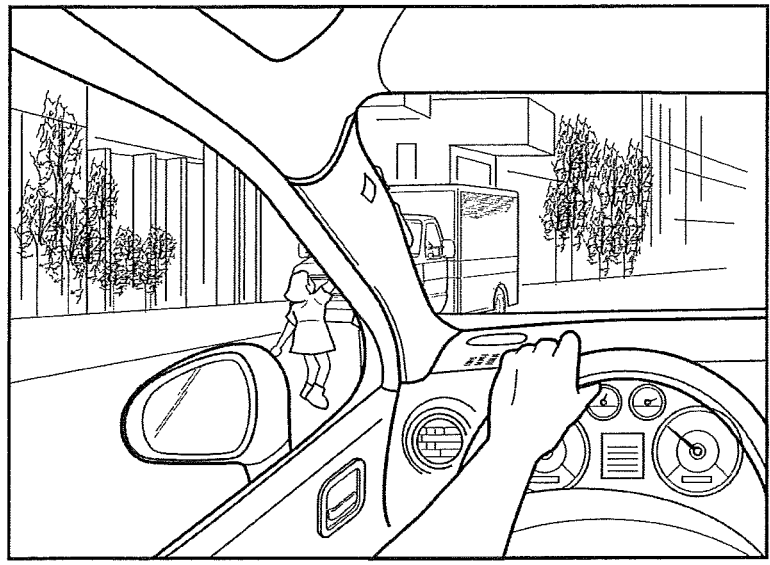
FIGS. 5A and 5B are views showing a case where a display is mounted on the A-pillar and monitor display is performed when a vehicle is running at low speed.
Figure 5B:
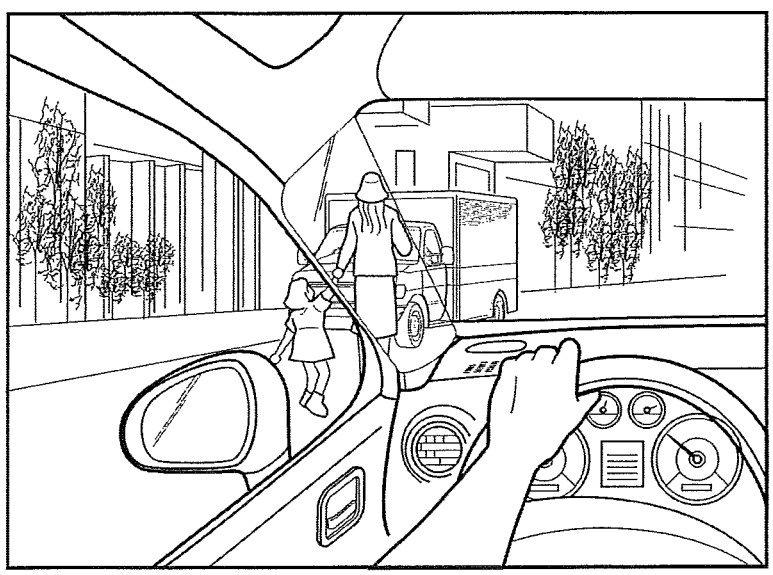

FIGS. 4A, 4B, 5A and 5B show a state where a captured image is displayed on the display 13 attached to the A-pillar on the driver side when the vehicle is running at high speed and a state where a captured image is displayed on the display 13 attached to the A-pillar on the driver side when the vehicle is running at low speed, respectively. FIGS. 4A and 5A show a case where the CMS is not mounted, and FIGS. 4B and 5B show a case where the CMS is mounted. As is evident from FIGS. 4A and 4B, an image of an adjacent lane behind the A-pillar, which is the range of a blind spot created by the pillar when the vehicle is running at high speed, can be displayed, and this can make the driver recognize that there is nothing in the range of the blind spot. Further, as is evident from FIGS. 5A and 5B, an image of a road behind the A-pillar, which is the range of a blind spot created by the pillar when the vehicle is running at low speed, can be displayed, and this can make the driver recognize that there are people in the range of the blind spot.

Figure 6A:
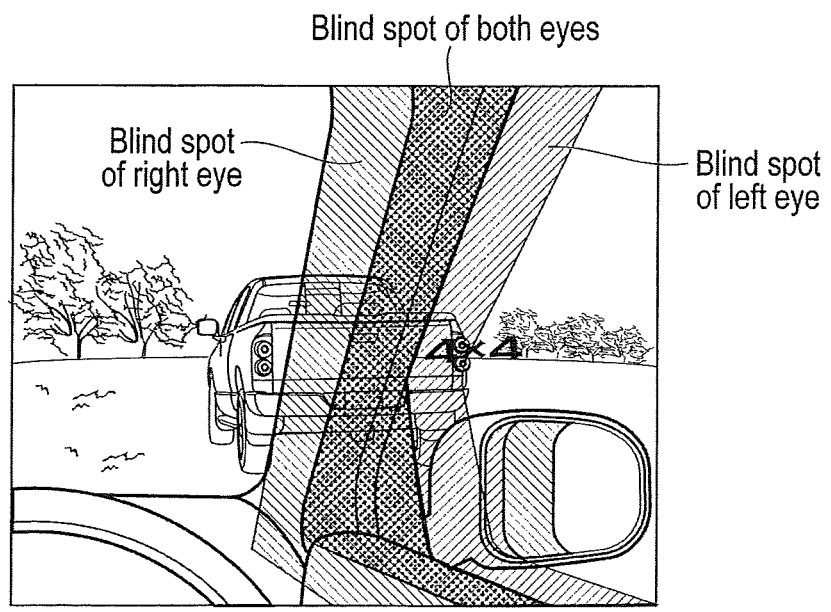
FIGS. 6A and 6B are conceptual diagrams showing a focus and an angle of convergence at the position of a display.
Figure 6B:
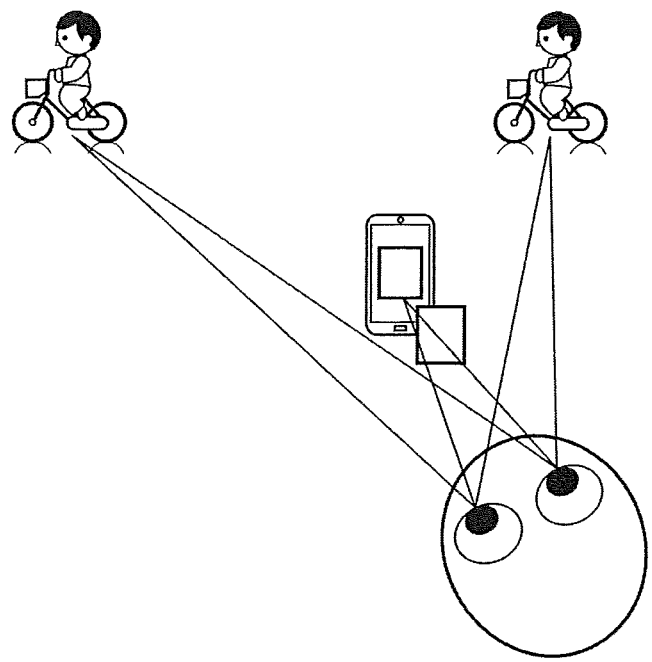
Figure 7A:
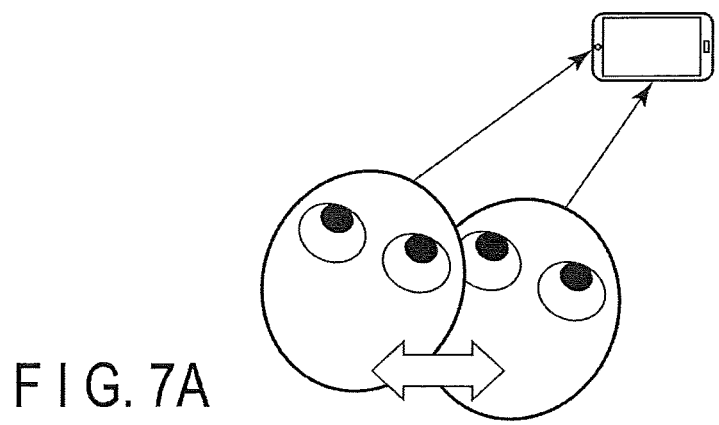
FIGS. 7A, 7B and 7C are conceptual diagrams showing consistency between a real image through a window and a display image.
Figure 7B:
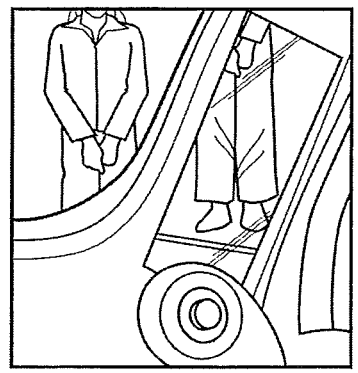
Figure 7C:
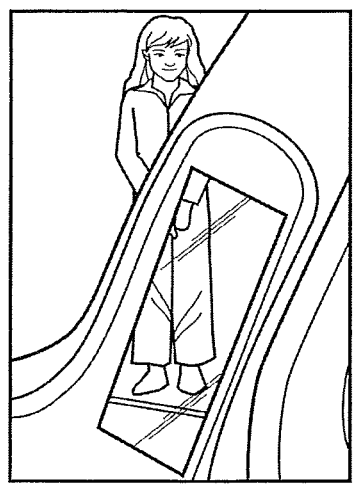

Here, when an image captured by the camera 11 is actually displayed on the display 13, as shown in FIG. 6A, the blind spot of the right eye and the blind spot of the left eye differ from each other, and the blind spot of both eyes will be a range in which both of these blind spots overlap each other. Further, as shown in FIG. 6B, since the display position of the display 13 is located on the near side of the real image through the window, when visually recognizing the image through the window, the driver cannot focus on the display image of the display 13 and the display image of the display 13 looks blurry to the driver. Further, as the position of the driver's eyes changes as shown in FIG. 7A, continuity between the image through the window and the image displayed on the display 13 changes, accordingly, as shown in FIGS. 7B and 7C. The angle of convergence and the focus are fundamental issues, and although consistency of the display image with the real image can be technically ensured, a complicated system is required.

Figure 8A:
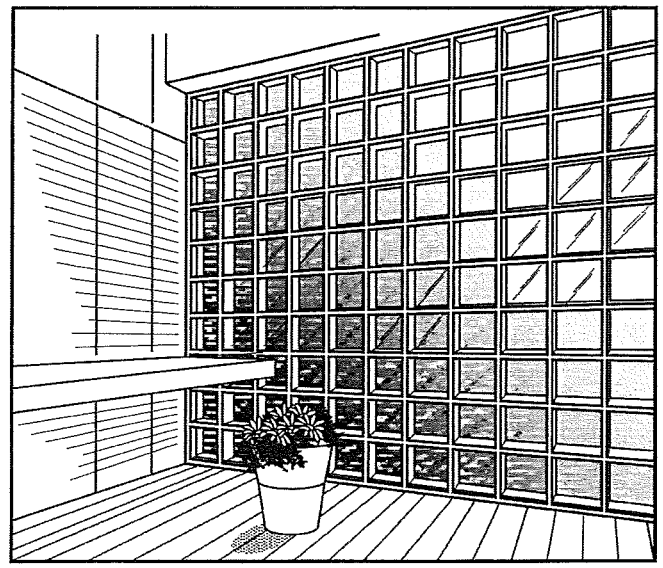
FIGS. 8A and 8B are views showing a state where there is an object behind a frosted glass.
Figure 8B:
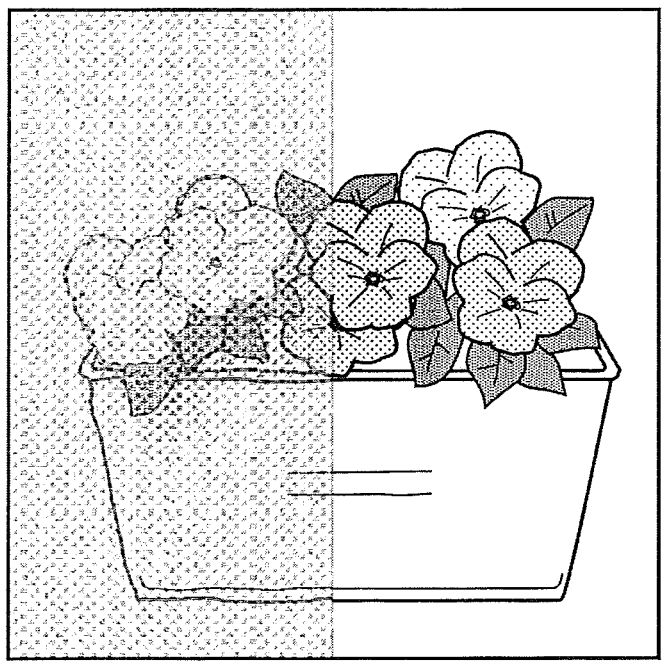

For this reason, in the present embodiment, the resolution of the display image is intentionally reduced, and only information indicating that "there is something behind" is displayed. For example, if an image such as an image transmitted through a glass block shown in FIG. 8A or a frosted glass shown in FIG. 8B is displayed, an object cannot be clearly recognized but the presence of an object behind can be recognized. As described above, an image is displayed at a low resolution, and depending on circumstances, processing such as issuance of an alarm or the like is performed for inducing avoidance of danger.

According to the monitor display system of the above-described configuration, even if the real image and the display image are deviated from each other to some extent, the driver can still recognize the presence or absence of an object in the range of the blind spot of the pillar portion. Therefore, it is not necessary to accurately measure the position of the point of view of the driver. Consequently, it is possible to reduce the cost of the system and reduce a visual recognition error and an uncomfortable feeling at the time of visual recognition.

Figure 9:
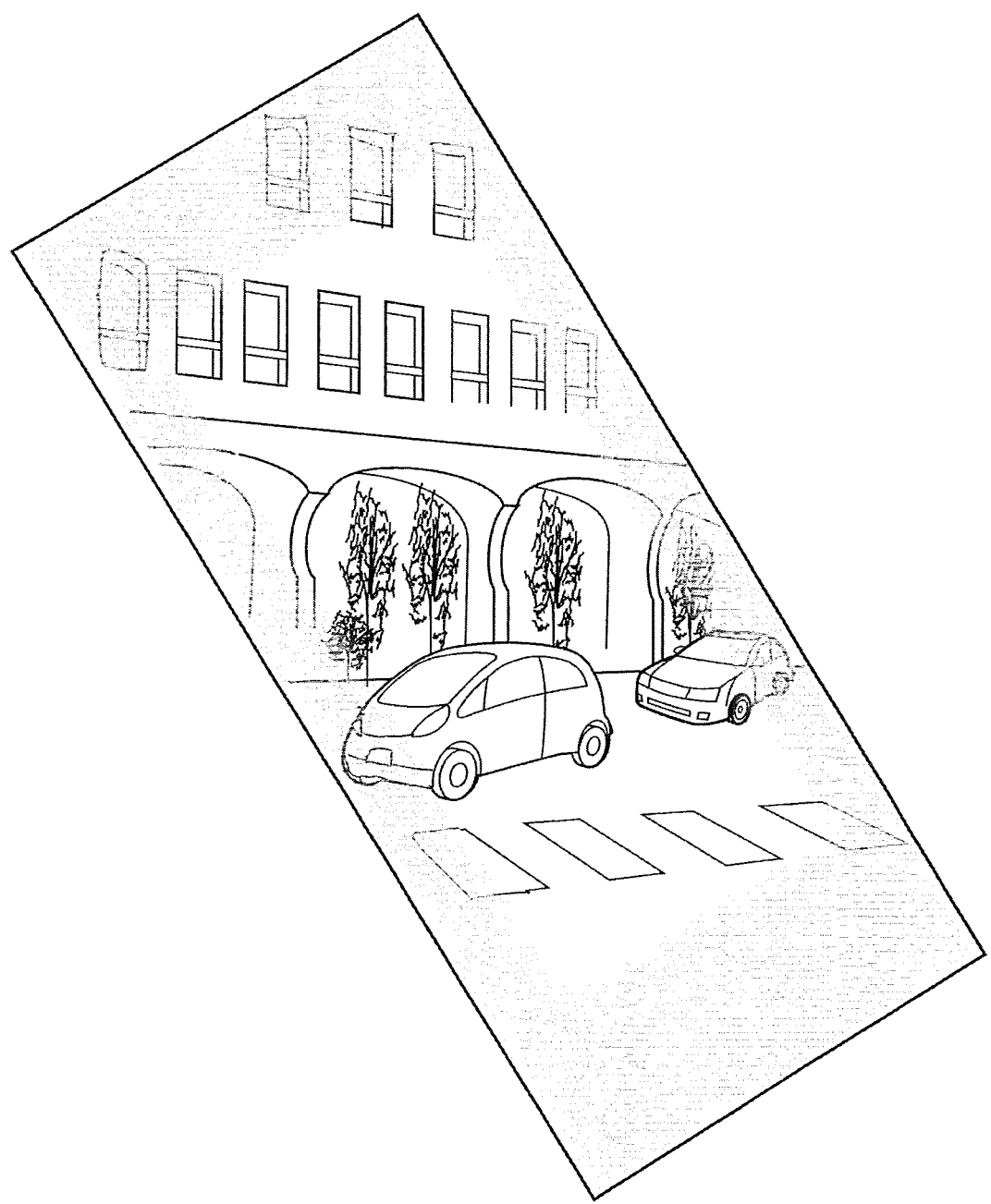
FIG. 9 is a view showing a display image in which a periphery thereof is made blurry by the image processing of the first embodiment.

Although the resolution of the display image is reduced in the above-described configuration example, since the sharpness is controlled by executing image processing such as reducing the resolution electrically, expandability is high and the original image can be displayed when necessary. For example, as shown in FIG. 9, only the periphery of the display image may be made blurry, and discontinuity with the real image through the window may thereby be moderated. According to this display method, the driver may still have an uncomfortable feeling to some extent, but the driver can understand the presence or absence of an object more accurately.

Second Embodiment

In the second embodiment, the resolution of an image is not always reduced but the resolution of an image is changed according to the speed of a vehicle.

FIG. 10 is a block diagram showing the configuration of a monitor display system according to the second embodiment, and FIG. 11 is a flowchart showing the flow of processing thereof. In the present embodiment, as shown in FIG. 10, a filter processor 122 having a variable LPF function is mounted in the image processing device 12, vehicle speed data is obtained from a vehicle speed sensor 216 of the vehicle equipped therewith, and the resolution is changed according to the speed of the vehicle in the filter processor 122 of the image processing device 12. More specifically, as shown in FIG. 11, the vehicle speed data is monitored (Step S21), and whether or not the vehicle speed is greater than or equal to a threshold value Vth is determined (Step S23). Here, the resolution is set to a low resolution when the vehicle speed is greater than or equal to the threshold value (Step S24), and the resolution is set to a high resolution when the vehicle speed is less than the threshold value (Step S25).

That is, in the present embodiment, the resolution is reduced and unnecessary information is not given to the driver when the vehicle is running at high speed, but on the other hand, the image is displayed without reduction of the resolution such that information on the surroundings will be given to the driver when the vehicle is running at low speed. The control of the resolution can be realized by changing the cutoff frequency of the low-pass filter (LPF) in accordance with the vehicle speed. For example, when the vehicle is running at high speed, a cutoff frequency fc is reduced, and the resolution of a display image is further reduced. As a result, a flicker given to the driver can be prevented. Further, when the vehicle is running at low speed, the cutoff frequency fc is increased. As a result, the driver can easily notice the presence of an object.

Third Embodiment

In the third embodiment, the resolution of an image is not always reduced but the resolution of an image is changed according to a right turn and a left turn.

FIG. 12 is a block diagram showing the configuration of a monitor display system according to the third embodiment, and FIG. 13 is a flowchart showing the flow of processing thereof. In the present embodiment, the filter processor 122 having the variable LPF function is mounted in the image processing device 12 as shown in FIG. 12, and a lighting output of a turn signal light (L/R) 217 of the vehicle equipped therewith is monitored (Step S31), whether or not an output is produced from the turn signal light 217 is determined (Step S32), the resolution of a display image is converted into a low resolution when no output is produced from the turn signal light (Step S33), and the resolution of a display image is converted into a high resolution when an output is produced from the turn signal light (Step S34). That is, when the turn signal light is used, the driver turns right or left, and the pillar portion enters the driver's sight, accordingly. Therefore, when the turn signal light 217 is used, the resolution of the display image is not reduced such that the driver can understand the surroundings. Further, in this case, the display may be performed only in the pillar portion on the side to which the driver turns or the display may be performed without reduction of the resolution.

As described above, in the present embodiment, the resolution of the display image of the blind spot is normally reduced, but the resolution of the display image of the display 13 of the pillar portion which enters the driver's sight on the side to which the driver turns in accordance with the turn signal light is not reduced (the sharpness is recovered). As a result, the driver can easily understand the surroundings and safety can be more reliably secured.

Fourth Embodiment

In the fourth embodiment, the brightness of the display is controlled in consideration of the difference of brightness between the outside of the vehicle and the display. That is, since the outside of the vehicle is bright in the daytime and dark at night, if the brightness of the display is not set to be about the same as the brightness of the outside, the display is extremely difficult to see. Therefore, the present embodiment aims to solve this problem.

Figure 15:
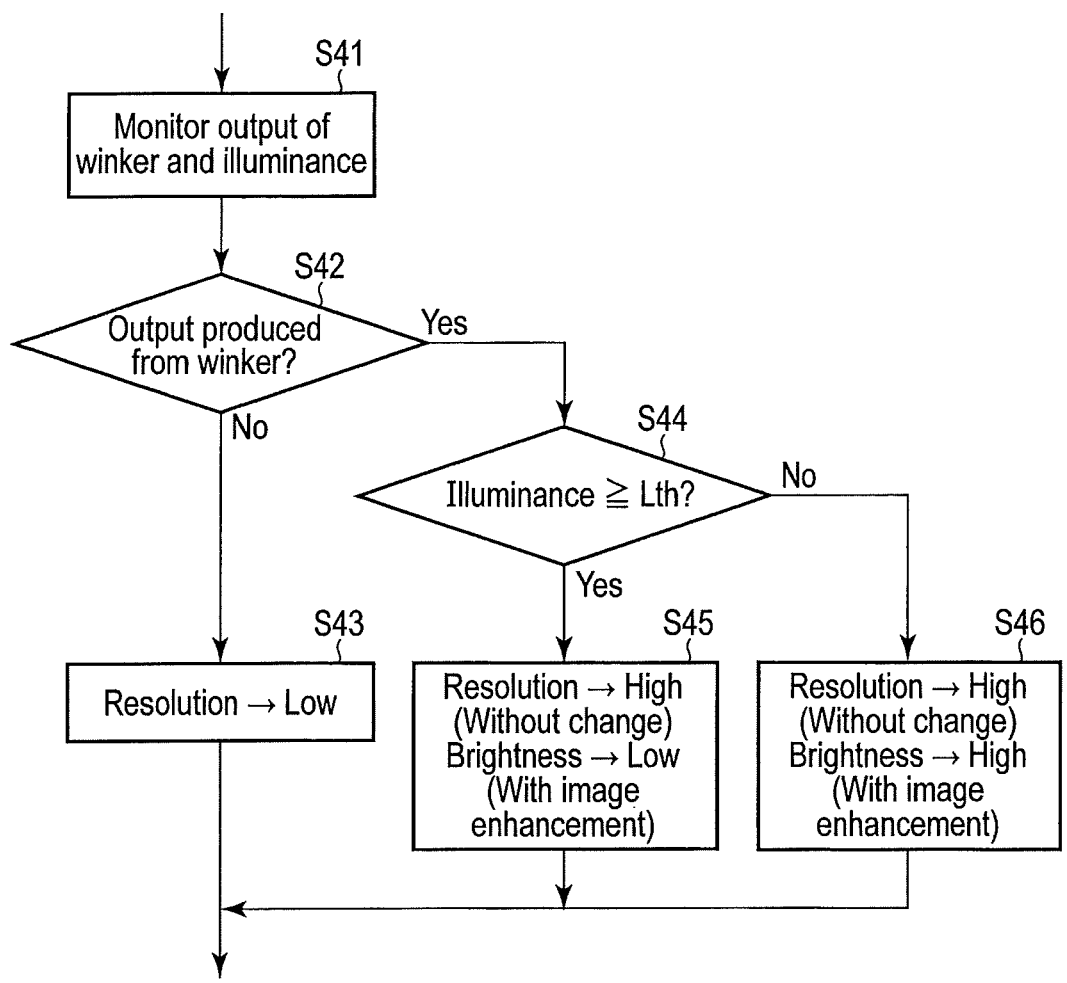
FIG. 15 is a flowchart showing the flow of image processing of the fourth embodiment.

FIG. 14 is a block diagram showing the configuration of a monitor display system according to the fourth embodiment, and FIG. 15 is a flowchart showing the flow of processing thereof. In the present embodiment, as shown in FIG. 14, not only the filter processor 122 having the variable LPF function but also an image enhancement processor 123 which enhances the luminance level of the image and thereby increases the brightness are mounted in the image processing device 12, and the turn signal light output data is obtained from the turn signal light (L/R) 217 of the vehicle equipped therewith and illuminance data on the outside of the vehicle is obtained from an illuminance sensor 218. In the image processing device 12, as shown in FIG. 15, the presence or absence of an output of the turn signal light (L/R) 127 and the illuminance data on the outside of the vehicle from the illuminance sensor 218 are monitored (Step S41), whether or not an output is produced from the turn signal light is determined (Step S42), and the resolution of an output image is converted into a low resolution when no output is produced from the turn signal light (Step S43). When an output is produced from the turn signal light, whether or not the illuminance on the outside of the vehicle is greater than or equal to a threshold value Lth is determined (Step S44), and when the illuminance on the outside of the vehicle is greater than or equal to the threshold value Lth, a display image is set to a state of a high resolution (without conversion) and without image enhancement (without a change in brightness) (Step S45). Further, when the illuminance on the outside of the vehicle is less than the threshold value Lth in Step S44, the display image is set to a state of a high resolution (without conversion) and image enhancement (with an increase in brightness) (Step S46).

That is, when the driver is driving at night, the driver cannot easily understand circumstances outside the vehicle with the naked eyes. On the other hand, the CMS has the function of enhancing the brightness and making the surroundings more easily understandable by performing image processing such as image enhancement. FIG. 16A is a view with the naked eyes at night, and FIG. 16B shows a display example when image enhancement processing is performed. By taking advantage of such characteristics, a method of using an image captured by a camera actively at night is considered. However, when an image is displayed in the pillar portion at night, since the contrast is high, the driver's attention may be diverted to the image. Therefore, for example, nighttime driving is recognized by the illuminance sensor 218 such that unnecessary information will not be displayed during normal driving. On the other hand, a right or left turn is detected by recognition of an output of the turn signal light 217, and at this time, the low-pass filter is cut off and an image subjected to image enhancement is displayed. As a result, the driver can easily understand circumstances outside the vehicle such as obstacles.

Figure 17:
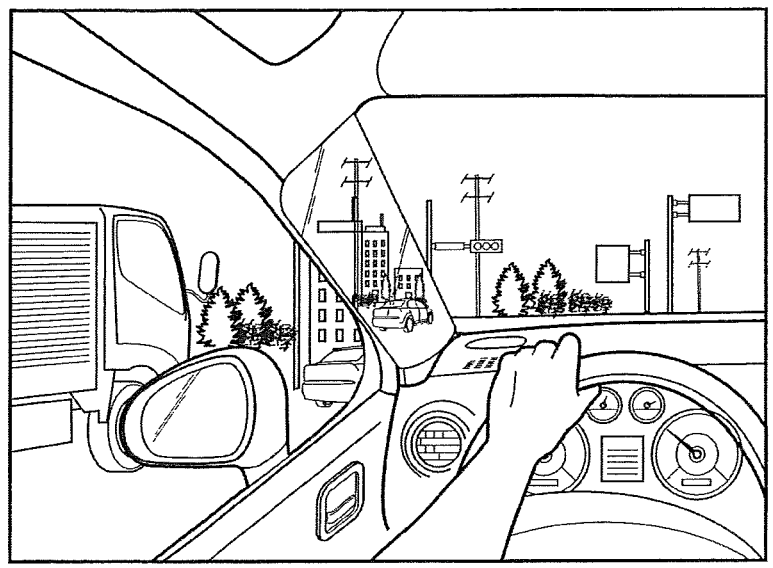
FIG. 17 is a view showing a case where an image wider than the range of a blind spot is displayed when a vehicle is running at low speed at night.

On the other hand, a method of using a display actively is also considered. For example, the driver may pay more attention to the blind spot at night or while the driver drives at low speed. On these occasions, a method of using an image of a camera actively is also considered. If an image of an angle of view wider than a range of view with the naked eyes is intentionally displayed as shown in FIG. 17, more information on the outside of the vehicle can be obtained, and this will contribute to ensuring of safety.

Fifth Embodiment

In all the above-described embodiments, a resolution is converted into a low resolution by image processing in the image processing device 12. However, if the camera 11 has a lens control function, it is also possible to reduce the resolution of a captured image itself by optically adjusting a focus.

Figure 18:
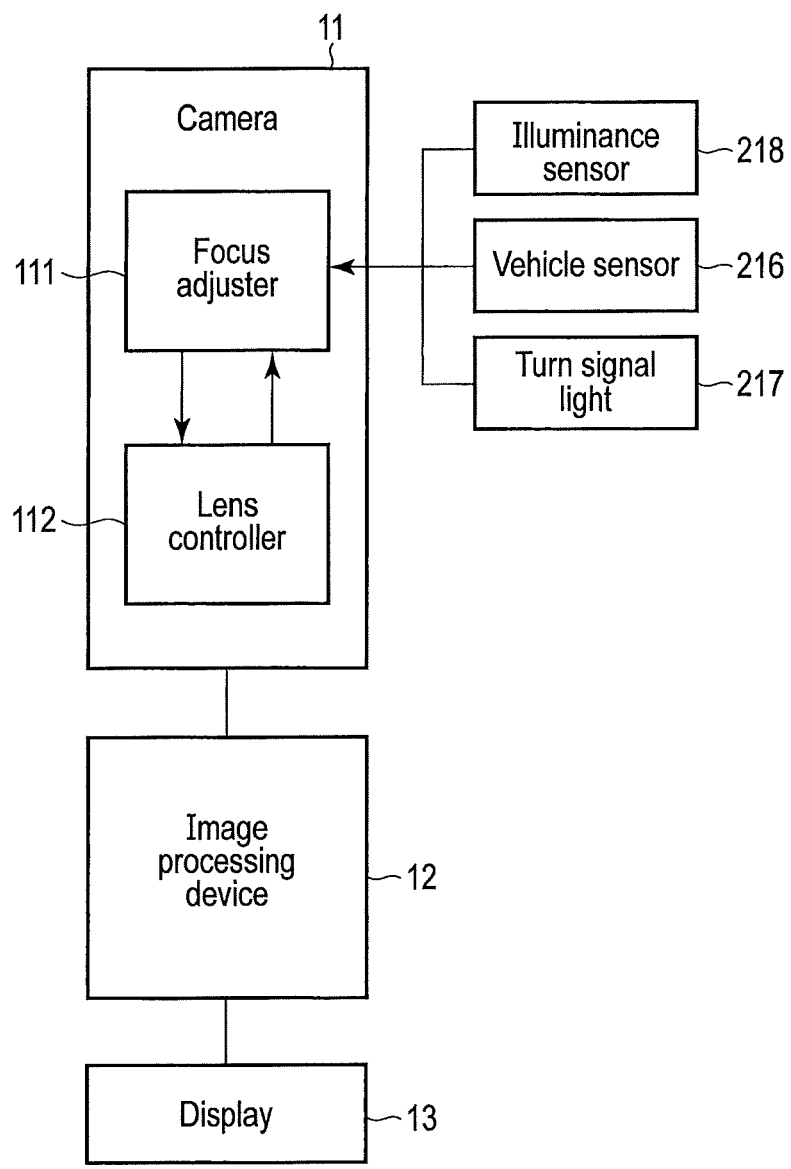
FIG. 18 is a block diagram showing a configuration which controls the lens of a camera, shifts a focus and controls a resolution, as a monitor display system according to the fifth embodiment.

FIG. 18 is a block diagram showing the configuration of a monitor display system according to the fifth embodiment. In the present embodiment, the camera 11 comprises a lens controller 111 and a focus adjuster 112. The focus adjuster 112 inputs the outputs of the vehicle speed sensor 214, the turn signal light 217 and the illuminance sensor 218, determines a vehicle speed, a side to which the vehicle turns, and an illuminance on the outside of the vehicle from the output data, shifts the focus of an image to be captured by the camera via the lens controller 111 based on the determination results, and appropriately reduces the resolution of a display image.

In the above-described embodiments, a display is attached to an A-pillar. However, the present invention is also applicable to a case where a display is attached to a B-pillar, a C-pillar or the like which creates a blind spot to the driver and an image of a range thereof is displayed. Further, the present invention is implementable not only in vehicles but also in other mobile objects.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A vehicle-mounted monitor display system comprising:
    a camera which captures an image of outside scenery including regions that become driver's blind spots by left and right pillars;
    left and right displays which display images on the left and right pillars; and
    an image processing device which generates left and right display images by cutting out regions which are the driver's blind spots from the image of outside scenery captured by the camera in conformity with a display range each of the left and right displays, and outputs the left and right display images to the left and right displays, wherein
    the image processing device comprises filters which convert the resolution each of the left and right display images into a low resolution by changing cutoff frequency, when a vehicle equipped therewith is running at high speed, further reduces the resolution of the display image by reducing the cutoff frequency based on the vehicle speed information, and detects the lighting of either of the left and right turn signal lights based on the lighting output to the left and right turn signal lights of the vehicle, and at least displays the display image on the display on the side where the lighting is detected, and increases the resolution of the displayed image by increasing the cutoff frequency of the filter.

2. The monitor display system of claim 1, wherein the filter selectively executes conversion of the resolution in accordance with conditions.

3. The monitor display system of claim 1, wherein the filter converts a resolution of a periphery of the display image into a low resolution.

4. The monitor display system of claim 1, wherein the image processing device controls a luminance of the display image based on a result of illuminance measurement of an outside of the vehicle.

5. A vehicle-mounted monitor display system comprising:
    a camera which captures an image of outside scenery including regions that become driver's blind spots by left and right pillars;
    a left and right displays which display images on the left and right pillars; and
    an image processing device which generates left and right display images by cutting out regions which are the driver's blind spots from the image of outside scenery captured by the camera in conformity with a display range each of the left and right displays, and outputs the left and right display images to the left and right displays, wherein
    the camera shifts a focus from a focus point in a state where a vehicle equipped therewith is moving, and returns the focus to the focus point during a period of detecting the lighting of either of left and right turn signal lights based on the lighting output to the left and right turn signal lights of the vehicle.

6. A display method of a vehicle-mounted monitor display system comprising:
    capturing an image of outside scenery a including regions that become driver's blind spots by left and right pillars;
    displaying the captured image on the left and right pillars; and
    converting the resolution of the display image into a low resolution by changing cutoff frequency of filtering; wherein
    when a vehicle equipped therewith is running at high speed, the filtering further reduces the resolution of the display image by reducing the cutoff frequency based on the vehicle speed information, and detects the lighting of either of the left and right turn signal lights based on the lighting output to the left and right turn signal lights of the vehicle, and at least displays the display image on the display on the side where the lighting is detected, and increases the resolution of the displayed image by increasing the cutoff frequency of filtering.

7. The display method of claim 6, wherein the filtering selectively executes conversion of the resolution in accordance with conditions.

8. The display method of claim 6, wherein the filtering converts a resolution of a periphery of the display image into a low resolution.

9. The display method of claim 6, further comprising:
    controlling the luminance of the display image based on a result of illuminance measurement of an outside of the vehicle.

* * * * *